April 25, 1950     C. WEISMAN     2,505,020
CONTROL MECHANISM FOR AIRCRAFT

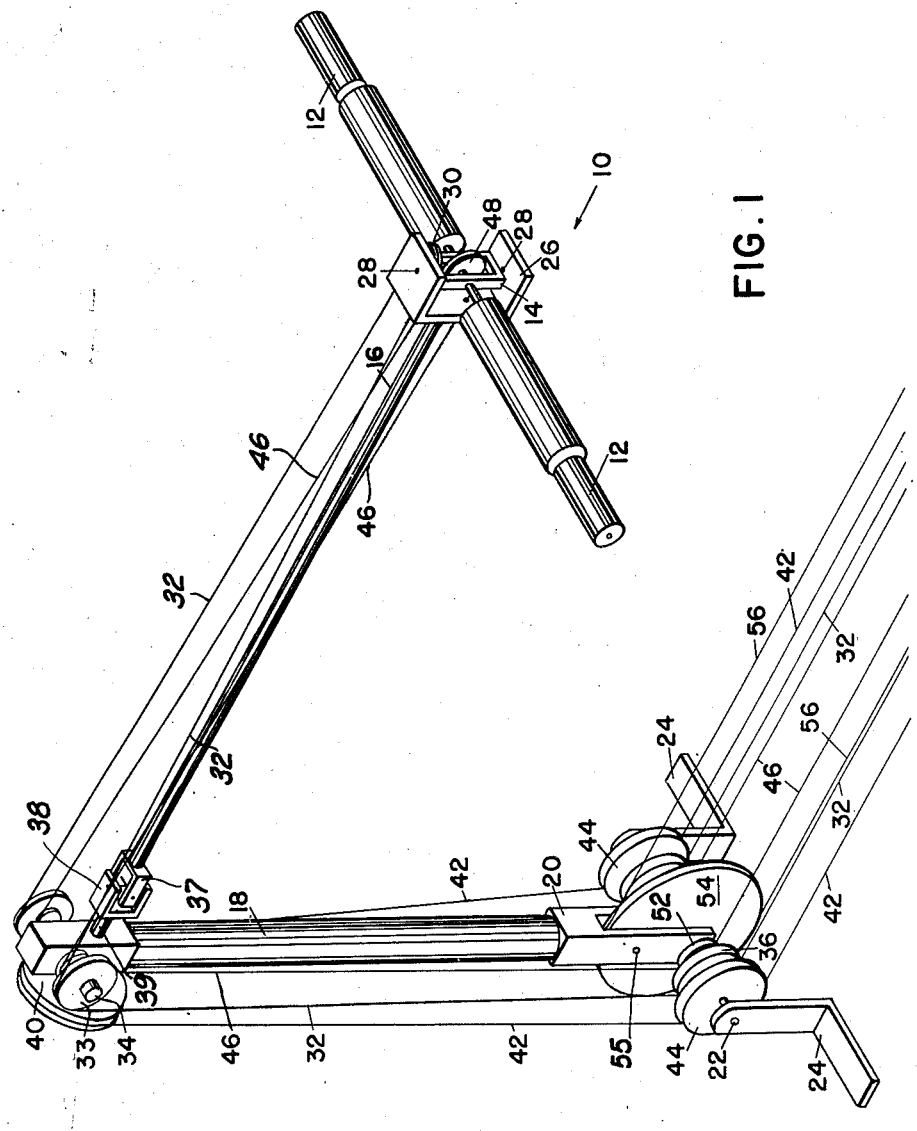

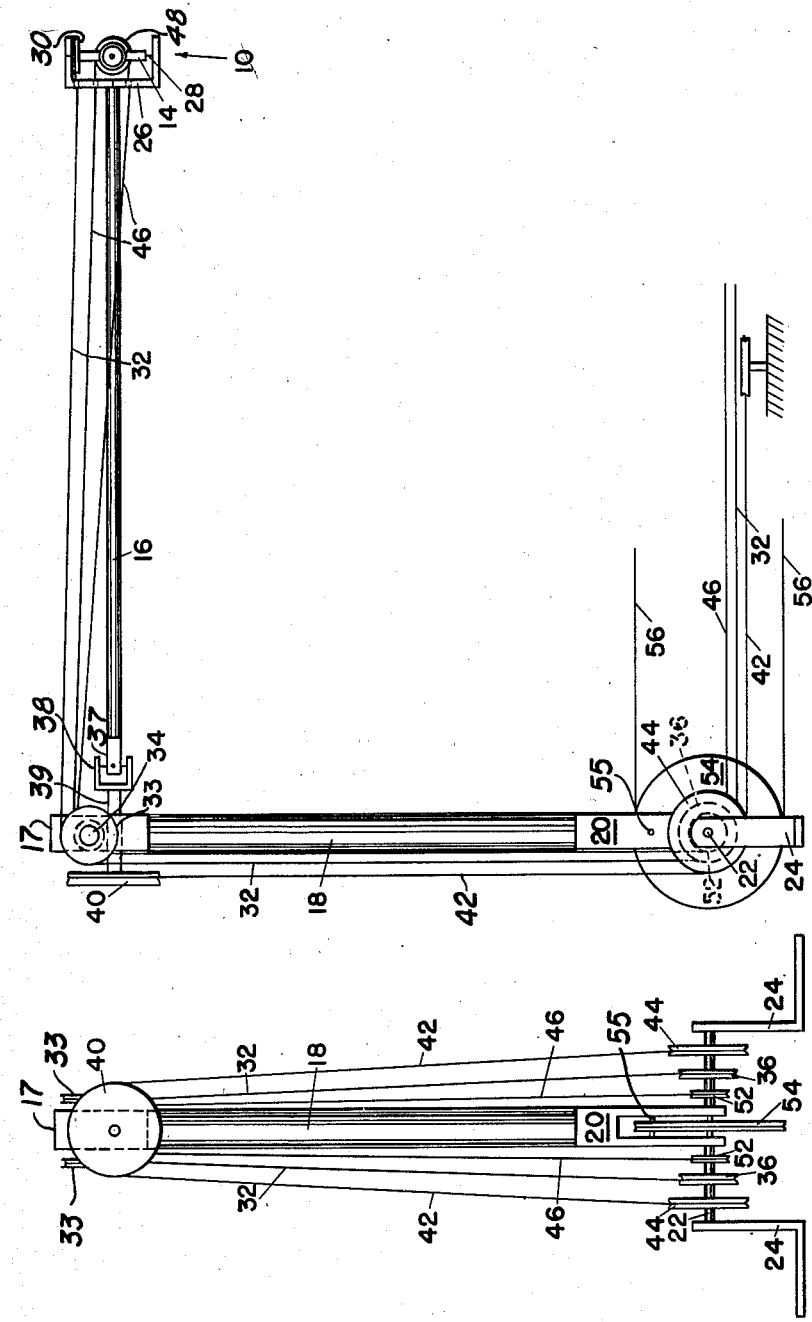

Filed Sept. 13, 1946     3 Sheets-Sheet 3

*INVENTOR.*
CHARLES WEISMAN
BY

*ATTORNEY*

Patented Apr. 25, 1950

2,505,020

UNITED STATES PATENT OFFICE 2,505,020

CONTROL MECHANISM FOR AIRCRAFT

Charles Weisman, United States Navy

Application September 13, 1946, Serial No. 696,971

1 Claim. (Cl. 244—83)

(Granted under the act of March 3, 1883, as amended April 30, 1928; 370 O. G. 757)

This invention relates to manually operated devices for controlling other machines, mechanisms, etc., and more specifically to a control for airplanes.

In general it is an object of the invention to provide a device of the character described that can be easily but sturdily constructed, that is simple in make up and operation, and that is reliable over long periods.

Another object is to provide a manually operated airplane control that controls rudder, ailerons, elevator tab and elevators and that may be considered a miniature wing directed in space.

Further objects and advantages of this invention, as well as its construction, arrangement and operation, will be apparent from the following description and claim in connection with the accompanying drawings, in which:

Fig. 1 is a perspective view of a device embodying one form of the invention,

Figs. 2 and 3 are side views of portions of the device shown in Fig. 1 taken at right angles to each other.

Figure 5:
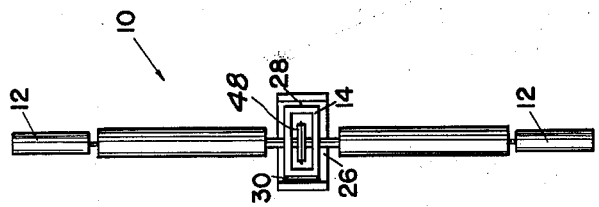
Fig. 5 is a view of the hand control of said device.
Figure 4:
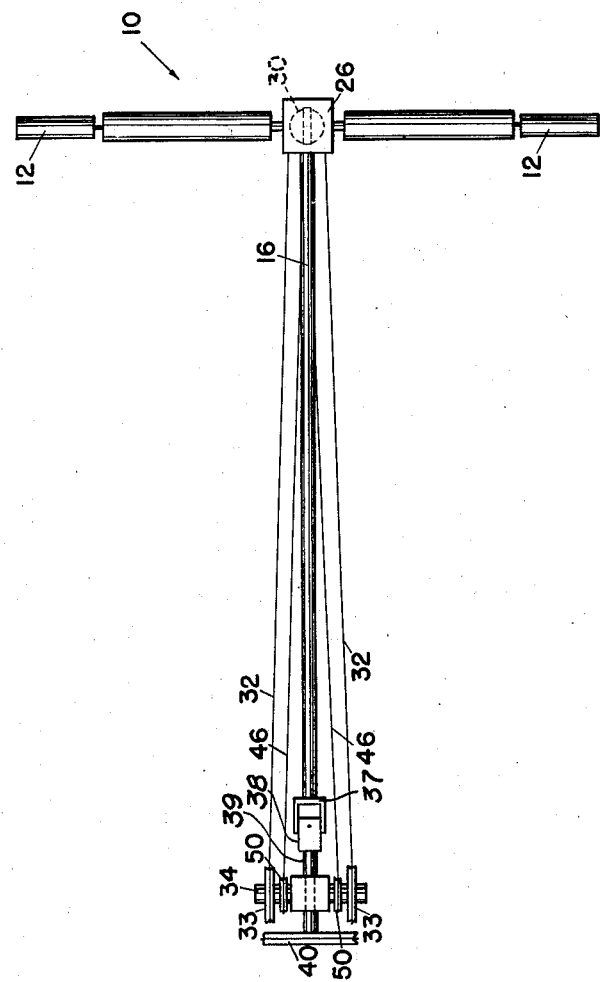
Fig. 4 is a plan view of the upper portions of the device.

Heretofore it has been customary to use the feet in the guiding of an airplane. The present device permits the hands to carry out not only the guiding functions heretofore assigned to the hands but also those guiding functions formerly carried out by the feet.

In the drawings, 10 denotes a hand control adapted to control independently and through the operation of the hands a plurality of other devices. In the form illustrated the hand control is used as an airplane direction controlling element. Its normal position is parallel to the floor of the plane which hereinafter will be assumed to be horizontal. Portions of the hand control may be considered hand grips 12. When control 10 is rotated about a vertical axis, normally extending through control 10, some direction controlling mechanism such as a rudder is operated. When the control 10 is rotated about the horizontal axis, normally perpendicular to the control 10 which may be in the shape of a cylinder, another direction controlling mechanism is operated for example one or more ailerons. When control 10 is translated linearly and as a whole, e. g., by a lateral translation of its longitudinal axis, a third mechanism is operated for example one or more elevators. When the hand control 10 is rotated about another axis which may be its longitudinal axis another direction controlling mechanism is operated, for example an elevator tab. Each of these operations may be performed independently or in conjunction with any one or more of the other operations.

The hand control of the present invention may be constructed to have the following motions: rotation about two axes (usually perpendicular to each other and intersecting in the middle of the hand control) plus a translation (as by lateral displacement of the longitudinal hand control axis, all points of that longitudinal axis either simultaneously following a straight line or simultaneously following a predetermined curve such as a circle).

The particular arrangement of parts used in the drawings as illustrations for carrying out the above functions is as follows. Hand control 10 is supported rotatably in bracket 14 which comprises trunnions 28 therefore disposed perpendicular to the axis of the control 10. The bracket 14 rotates on trunnions 28 in the arms of the U-shaped bracket or frame 26 which is attached to the shaft 16 at one end thereof.

One coupling member 37 of a universal joint is attached to the end of shaft 16 opposite the bracket 26, the other coupling member 38 of the universal joint being attached to the pulley 40 by means of shaft 39.

The shaft 39 rotates in bearing mount 17 attached to the upper end of pillar 18, the lower end of the pillar 18 being attached to the bifurcated bracket 20 which carries the shaft 22 for rotation in bearings of the brackets 24.

The brackets 24 are rigidly attached to the frame of the aircraft in any suitable manner, and provide bearings for the pillar 18 to swing on a horizontal axis disposed transversely to the longitudinal axis of the craft. The pillar 18 projects upwardly from the brackets 24, which may rest on the deck occupied by the pilot, and the pillar 18 is thus enabled to swing in a vertical plane directed lengthwise of the craft.

The shaft 39 is rotatable on an axis perpendicular to the axis of pillar 18 and directed longitudinally of the craft. The shaft 16 is also rotatable through the universal joint 37—38 on an axis disposed longitudinally of the craft, but is also capable of being swung up and down, or to the right and left, by means of its connection to shaft 39 through the universal joint 37—38.

The control 10 extends transversely from the axis of shaft 16 in both directions away from it, and comprises hand grips 12 at its ends by means of which the control 10 may be oscillated out of perpendicular relationship to the shaft 16, this rotation being on the axis of trunnions 28. The hand grips 12 are also rotatable on the axis of the control 10, the bracket 14 providing bearings for the shaft of control 10 to enable this rotation.

The pulley 30 is fixed to the trunnion 28 to rotate therewith. A belt, wire or other similar device 32 may pass around pulley 30 and connect with some direction control mechanism of the plane such as the rudder. The specific layout for belt 32 and other belts later described permits several of these belts to be carried, together and parallel, away from the region of the operator's seat. Pulleys 33 are supported on an axle 34 which is rotatable in a bearing of the mount 17 attached to the upper end of pillar 18, and the belt 32 extends downwardly and also passes around pulleys 36 on axle 22, extending away therefrom in a direction longitudinally of the craft.

Belt 42 passes around pulley 40 and pulleys 44 on axle 22 and thence in a direction longitudinally of the craft and alongside the belt 32. A rotation of the hand control 10 about the longitudinal axis of shaft 16 causes rotation of pulley 40 and the motion of pulley 44 to operate a direction control mechanism such as one or more ailerons.

The bracket 14 embodies a bearing for the pulley 48 fixed to the shaft of the control 10, the pulley 48 being rotatable by the handles 12 being rotated on the axis of the control. A third belt 46 passes around a pulley 48, passes around pulleys 50 on axle 34 and finally around pulleys 52 on axle 22, and extends away from pulleys 52 in a direction longitudinally of the craft alongside the belt 32. Belt 46 moved by pulley 48 and led in any conventional fashion as thus described is adapted to connect to another direction control mechanism such as an elevator tab. The operator merely rotates his fists and the hand grips 12 fixed to the control 10, which is thereby rotated on its longitudinal axis to motivate pulley 48 and the elevator tab.

Pulley 54 between the prongs of bifurcated bracket 20 is fixed thereto by means of the pin 55 and is therefore rotatable therewith about axle 22. Wire or belt 56 passes over pulley 54 and extends away therefrom longitudinally of the craft alongside the wires 32, 42 and 46. By the operator actuating the control 10 towards or away from himself, he swings the upright pillar 18 in its vertical plane, thereby rotating the pulley 54 on the axis of shaft 22 and moving belt 56 to operate some direction control mechanism such as the elevators.

The operation of the device is extremely simple and tests have shown that it may be quickly learned. A twist of the body to the left translated through the hands to the hand control 10 causes a rudder change that turns the plane to the left (or the right as the case may be). By moving the hands forward and back the nose of the plane can be kept on the horizon and by a rotation of the wrists the elevator tab is operated. Similarly, a raising of one hand and lowering of another gives the normal aileron control. The operator may conceive of the hand control as a miniature wing in which he is located and by manually directing with wing he unconsciously directs the plane as he wishes it to go. The present device permits the hooking in of dual controls in the simple fashion as it is only necessary to couple them on a common axle.

The present invention gives a natural coordination of rudder and ailerons control in that it follows the natural trend of the body. It leaves the feet of the pilot free and it has been found that the additional control present in the hands is no more fatiguing while the release of the control from the feet gives distinct and considerable relaxation to the pilot.

Of particular advantage is the arrangement when rudder and aileron control are effected by motion about two intersecting axes.

Elevator control may be effected by rotation of the hand control about its longitudinal axis but it has been found more convenient to use said motion for elevator tab control.

It is to be understood that various modifications and changes may be made in this invention without departing from the spirit and scope thereof as set forth by the appended claim.

The invention described herein may be manufactured and used by or for the Government of the United States of America for governmental purposes without the payment of any royalties thereon or therefor.

What is claimed is:

Airplane-control mechanism comprising a rudder, an aileron, an elevator, a manually grippable element rotatable about two axes at an angle with each other, means operated by said rotations severally to respectively control said rudder and said aileron, and means operated by a translation of said element to control said elevator, said element being operable to undergo rotation about another axis, an elevator tab, and means operable by the last-mentioned rotation to control said tab.

CHARLES WEISMAN.

REFERENCES CITED

The following references are of record in the file of this patent:

UNITED STATES PATENTS

| Number | Name | Date |
|---|---|---|
| 1,030,803 | Borman | June 25, 1912 |
| 1,864,329 | Volk | June 21, 1932 |
| 2,066,375 | Truman | Jan. 5, 1937 |
| 2,386,709 | Osborn | Oct. 9, 1945 |
| 2,398,601 | Seifert | Apr. 16, 1946 |
| 2,418,369 | Schubert | Apr. 1, 1947 |